March 10, 1953     G. SMITH     2,631,272

MEASURING SYSTEM

Filed Dec. 6, 1949     3 Sheets-Sheet 1

INVENTOR
GRAYDON SMITH
BY
*Curtis, Morris & Safford.*
ATTORNEYS

March 10, 1953

G. SMITH 2,631,272

MEASURING SYSTEM

Filed Dec. 6, 1949

INVENTOR
GRAYDON SMITH
BY
*Curtis, Morris & Safford*
ATTORNEY

March 10, 1953   G. SMITH   2,631,272
MEASURING SYSTEM
Filed Dec. 6, 1949   3 Sheets-Sheet 3
FIG. 10.
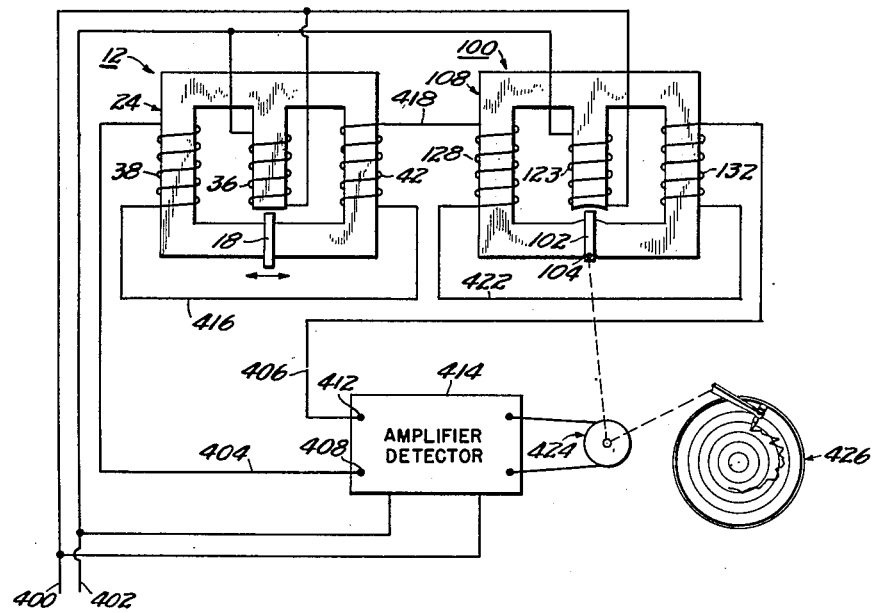
FIG. 11.
FIG. 12.
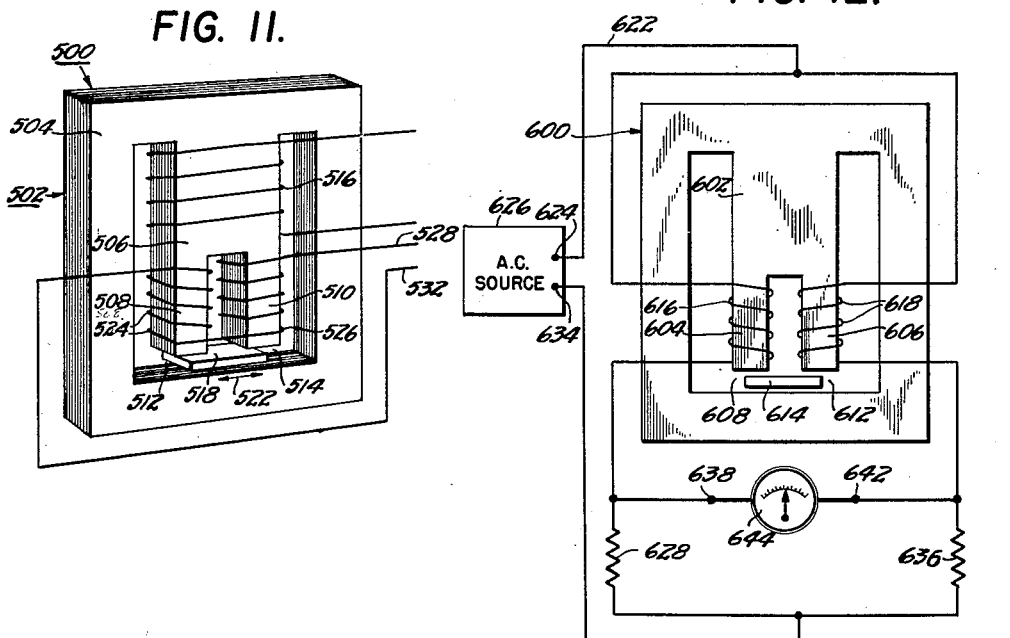
INVENTOR
GRAYDON SMITH
BY
Curtis, Morris & Safford
ATTORNEYS Patented Mar. 10, 1953

2,631,272

UNITED STATES PATENT OFFICE 2,631,272

MEASURING SYSTEM

Graydon Smith, Concord, Mass., assignor to Graydon Smith Products Corporation, Boston, Mass.

Application December 6, 1949, Serial No. 131,410

7 Claims. (Cl. 340—199)

This invention is in the field of electrical measuring systems and relates particularly to devices for producing an electrical signal whose value is a measure of the displacement of a movable element from a predetermined position.

In many instances, the value of an unknown condition can be measured by arranging for the condition to control the physical displacement of a movable element and measuring the extent of the displacement. For example, it is often convenient to measure pressure, strain, roughness, etc. by measuring the amount of movement or the position of such a controlled element. In gauging, a feeler is commonly used and its displacement from a predetermined position is a direct measure of the deviation of the test piece from a predetermined dimension.

Because electrical signals can be magnified electronically, it is advantageous in many instances to translate the position or displacement of the movable element into an electrical signal which, after amplification, can be used to operate an indicator, recorder, control system, or the like.

A large variety of such devices for translating physical displacements into electrical signals have been heretofore proposed. However, certain undesirable characteristics inherent in the prior devices have limited their use. For example, some position responsive devices are not sufficiently sensitive to permit precise measurements, some have unstable or non-linear response characteristics which may be of such nature that correction or compensation is difficult or impossible, and many such devices deliver only feeble electrical quantities so that compensation circuits which waste part of the measuring signal in order to compensate for the characteristic of the measuring device or other parts of the system cannot be employed. These and other defects or shortcomings of such sensing devices must be considered carefully in selecting the type of device to be used for a particular application. Thus, for certain operations, the sensing device must be one that permits a large amount of over-travel of the positioned element without damaging the measuring system, whereas for other uses, it is more important that the positioned element be freely movable so as to place minimum load on the driving system.

It is an object of the present invention to provide a position responsive device which combines a large number of advantageous features and which overcomes in a large measure the disadvantages of earlier devices whereby it is well suited for use in many widely different applications. In a preferred embodiment of the invention, a movable non-magentic element controls the relative distribution of alternating magnetic flux between two alternate magnetic circuit paths.

The flux in the two paths is caused to generate corresponding voltages by which the relative distribution of flux can be measured. Such an arrangement provides high sensitivity, a relatively high output signal, and minimum reaction forces on the positioned element. In one aspect, the invention is directed to improving the sensitivity of position responsive devices and increasing the magnitude of the output signal with a given displacement. Another aspect of the invention relates to such a position responsive device capable of measuring displacement parallel to a given path even though the non-magnetic element is not guided mechanically to move along this path. Still another aspect of the invention is directed to a a position sensitive device in which there is substantially no reactive force developed on the movable element by the associated magnetic circuits.

These and other objects, aspects, and advantages of the invention will be in part pointed out in and in part apparent from the following description considered in conjunction with the accompanying drawings, in which.

Figure 6:
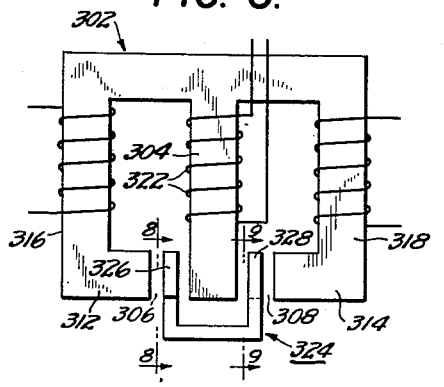
Figure 8:
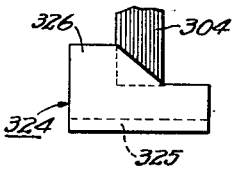
Figure 9:
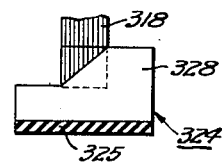
Figure 7:
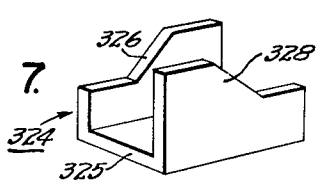

Figure 6 presents, diagrammatically, still another embodiment of the invention permitting infinite over-travel of the movable element;

Figure 7 is a perspective view of the movable element of Figure 6;

Figure 8 is a partial sectional view taken along line 8—8 of Figure 6;

Figure 9 is a similar view taken along line 9—9 of Figure 6;

Figure 10 shows, diagrammatically, a follow-up system incorporating a second position responsive device;

Figure 11 shows still another embodiment of the invention; and

Figure 12 shows, diagrammatically, an additional embodiment of the invention and a bridge-type measuring circuit.

Figure 1:
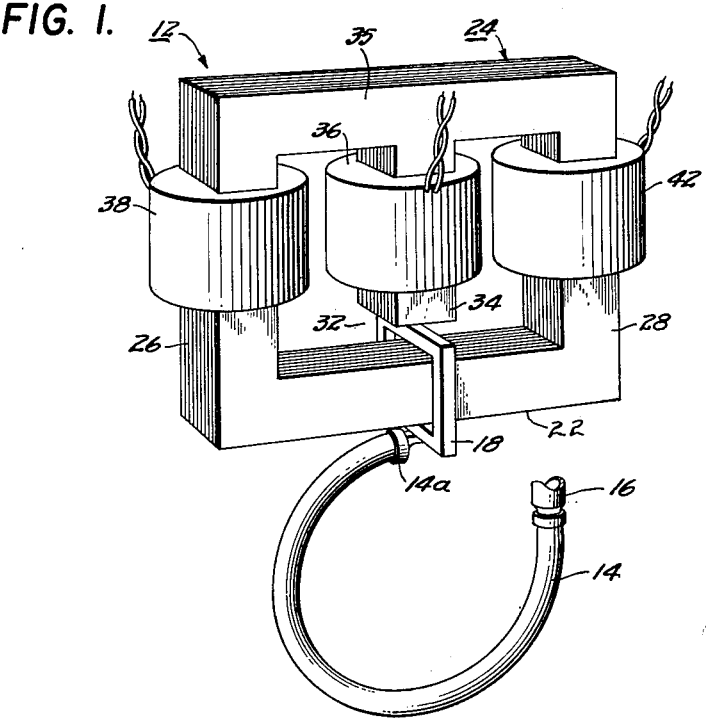
Figure 1 is a perspective view of a position responsive device embodying the present invention adapted for measuring the deflection of a Bourdon tube.

As shown in Figure 1, a position responsive device, generally indicated at 12, is arranged to measure pressure by means of a Bourdon tube 14. When the internal pressure of the Bourdon tube is varied, as by changing the pressure applied to it through a fitting 16, the end 14a of the tube is caused to move in accordance with the pressure variation, as is well known in the art.

The physical displacement of the end 14a from a neutral or zero position is measured by a ring or "flux-barrier" 18 which is carried by the end of the Bourdon tube. By the term "flux-barrier" is meant a non-magnetic, electrically conducting member which resists any change in the magnetic flux linking it or passing through it. In this example, the flux-barrier 18 comprises a shorted turn of conductive non-magnetic material such as copper, brass, or the like, and encloses, and is spaced from, the bottom leg 22 of a magnetic core, generally indicated at 24, formed, for example, of laminations of a good grade of transformer iron. Because the shorted turn or flux-barrier 18 tends to prevent any change in the flux linkages through it, it acts to prevent the flow of any appreciable amount of alternating flux through the leg 22 of the core 24 at the position of the flux-barrier. Accordingly, movement of the flux-barrier along the leg 22 is utilized to control the relative division of flux between two outer legs 26 and 28 of the core 24.

In order to accomplish this flux control, the flux-barrier 18 extends through an air gap 32, which, in this example, is of uniform cross-sectional area, formed by the space between the upper surface of core leg 22 and the free end of an inner core leg 34. This core leg 34 is connected to an upper leg 35 to form a T-shaped portion of the core 24, the outer ends of the cross-bar of the T being joined, respectively, to the outer core legs 26 and 28. Alternating flux is induced in the core 24 by the flow of alternating current through an energizing winding 36 which surrounds the inner core leg 34.

If the flux-barrier 18 is positioned at the horizontal center of the air gap, that is, midway between the right and left hand edges of the air gap 32, as shown in Figure 1, the flux produced by winding 36 will be divided equally between the right and left portions of the bottom core leg 22 with one-half of the flux lines extending through each of the core legs 26 and 28.

If the flux-barrier 18 is displaced laterally in either direction from this center or zero position, the balance of flux in the two legs 26 and 28 will be disturbed. For example, assume that the pressure in the Bourdon tube 14 changes so as to cause the flux-barrier 18 to move along core leg 22 toward the right as viewed in Figure 1, so as to reduce the area of the air gap on the right of the flux-barrier 18 and to increase the area of the air gap on the left of the flux-barrier 18. The flux lines through that portion of the air gap 32 to the left of the flux-barrier 18 will pass into the core leg 22, but will be prevented from extending to the right through the core leg 22 by the presence of flux-barrier 18, and so will extend through the outer leg 26; and those flux lines extending across the air gap to the right of the flux-barrier 18 will be confined to the other outer leg 28. Thus, the greater proportion of the flux will be in leg 26 and a lesser proportion will be produced in leg 28. Because the distribution of flux across the air gap 32 is substantially linear, over the useful range of movement of the flux-barrier 18, the relative division of flux between the two legs 26 and 28 of the core 24 is directly proportional to the displacement of the flux-barrier 18 from its zero position. It is apparent, however, that for particular applications, where a non-linear response characteristic is desired, the gap may be constructed so that it is non-uniform in a manner to give the desired response characteristic.

In order to measure the relative amounts of flux in the two legs 26 and 28, two identical windings 38 and 42 are positioned, respectively, around the legs 26 and 28. Auxiliary apparatus and the circuit connections for measuring the relative distribution of flux are shown diagrammatically in Figure 2. A source 44 of alternating current is connected by leads 46 and 48 to the energizing winding 36 which surrounds the inner core leg 34 of the position responsive device 12. The source 44 delivers an alternating current signal which, for example, may be at the frequency of the alternating current supply mains, and which preferably is stabilized in magnitude to minimize disturbances such as might be caused by changes in the supply voltage. The flow of current through the winding 36 produces alternating magnetic flux which is divided between the outer core legs 26 and 28 in accordance with the displacement of the flux-barrier 18. The windings 38 and 42 are connected, in series opposition, to the input terminals 52 and 54 of an amplifier-detector, indicated in block form at 56. This circuit may be traced from terminal 54 through lead 58, winding 42, lead 62, winding 38, and lead 64 to the terminal 52.

With the flux-barrier 18 in its zero position, equal voltages are produced in the windings 38 and 42 and effectively cancel each other. When the flux-barrier 18 is displaced either to the right or left of its zero position, these voltages are no longer equal and the difference voltage is impressed on terminals 52 and 54. This unbalance signal is amplified and detected, and the output signal appearing across terminals 66 and 68 of the amplifier-detector 56 is connected to an indicator 72 which may be a meter, recorder, or control system.

Phase sensing is utilized in the amplifier-detector 56 as a means for determining the direction of displacement of the flux-barrier 18 from its zero position, that is, to determine whether the magnitude of the flux in leg 26 is more or less than the magnitude of the flux in leg 28. Accordingly, the signal source 44 is connected also by leads 74 and 76 to the amplifier-detector 56, so that the phase of the signal applied to input terminals 52 and 54 can be compared with the phase of the signal from source 44.

For applications where it is not necessary to determine the direction of displacement of the flux-barrier 18, the phase detection portion of the system can be eliminated and the amplified signal used to operate an indicator, recorder, or other device. Measuring systems of the general type indicated in block form at 56 are well known so that a detailed description is not necessary here.

Figure 2:
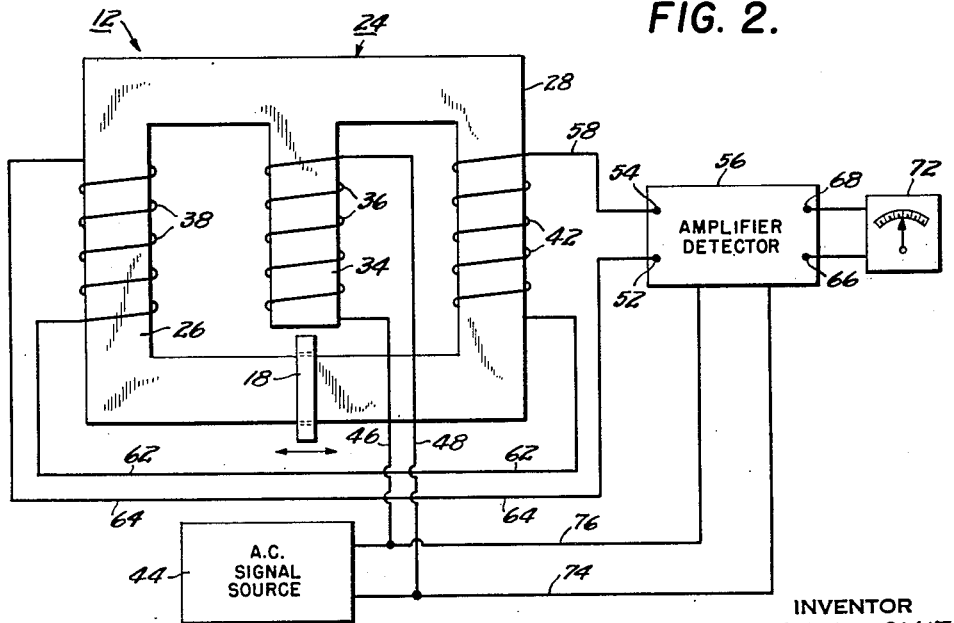
Figure 2 shows diagrammatically the position responsive device of Figure 1, together with auxiliary apparatus for measuring the displacement of the movable element.

With the relatively simple arrangement illustrated in Figure 2, it has been found that the position responsive device 12 is exceptionally sensitive and that its stability under normal operating conditions is excellent. A relatively high voltage output signal is produced so that compensating networks can be employed readily to correct automatically for temperature deviation and other factors affecting the system. In most applications, it will be found that no compensation networks are required to correct for errors in the position responsive device, which can be constructed to have an inherently linear characteristic and substantially unaffected by ordinary changes in environmental conditions. The null point is sharp and no appreciable third harmonic component is present in the output signal so that a good null is obtained. By maintaining proper impedance relationships between the windings 38 and 42 and the input circuit of amplifier-detector 56, the phase shift introduced by the device may be made negligible so that compensating circuits or phase shifting networks ordinarily are not required.

It is to be noted in the embodiment shown in Figures 1 and 2 that no guide or track is utilized for directing the movement of the flux-barrier 18, which is supported entirely by the Bourdon tube 12. Thus, there is no restraining force which would tend to retard the free flexing of the Bourdon tube, as is necessary with more conventional arrangements where the Bourdon tube must overcome frictional or other retarding forces. This arrangement is possible because it is only the lateral movement of the flux-barrier 18, as viewed in Figure 2, which affects the division of flux between the core legs 26 and 28. For example, translation of the flux-barrier upwardly and downwardly within the air gap 32 has no effect on the relative division of flux, nor does transverse movement of the flux-barrier in a direction perpendicular to the plane of the paper, as viewed in Figure 2. The relative flux division between the two core legs 26 and 28 is not affected appreciably by rotary movement of the flux-barrier 18 about either a vertical or horizontal axis through its center parallel to the plane of the paper of Figure 2, nor is it affected by angular movement of the lower portion of the flux-barrier 18 about a horizontal axis passing through the top of the flux-barrier. Accordingly, the system, being responsive only to translation of the flux-barrier 18 to the right or left, as seen in Figure 2, no guiding track or other means is required for the flux-barrier and any incidental displacement of the flux-barrier in directions other than the transverse direction mentioned will not introduce appreciable errors into the measurements.

The flux-barrier is of non-magnetic material so that there is no magnetic attraction between it and other parts of the measuring device to impede its free movement, and it has been found that there is very little reactive force on the flux-barrier 18 caused by the circulating currents induced therein. This effect is negligible if a high impedance circuit is connected across the windings 38 and 42. Thus, when these windings are coupled to the grid-cathode input circuit of an amplifier, such a high impedance arrangement is readily available.

Figure 3:
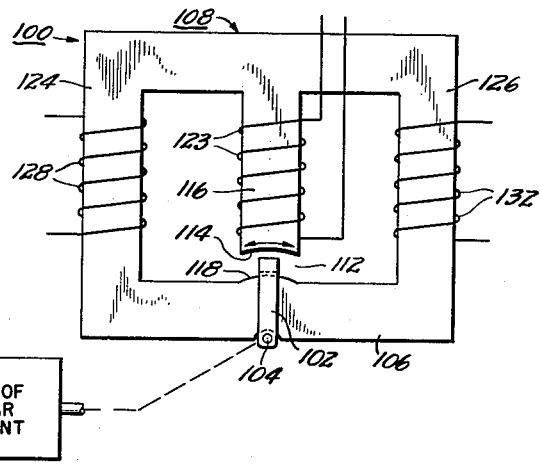
Figure 3 shows another embodiment of the invention for measuring angular displacement.

Figure 3 shows a positive responsive device, generally indicated at 100, for measuring angular movement or displacement, rather than linear displacement. A ring-shaped flux-barrier 102 similar to flux-barrier 18, is pivotally mounted, as at 104, near the lower surface of a core portion 106 of a magnetic core, generally indicated at 108, similar to the core 24 of Figure 2, so that the upper part of the flux-barrier 102 moves along an arcuate gap 112 defined by a concave end 114 of an inner leg 116 of core 108 and a convex boss 118 formed on the adjacent surface of the core portion 106. A source 122 of angular rotation, the extent of which is to be measured, is coupled by any suitable means (not shown) so as to cause the flux gate 102 to rotate about its pivot 104.

Flux in induced in core leg 116 by an energizing winding 123, as in Figure 2, and displacement of the upper end of the flux-barrier 102 from its null position at the center of gap 112 will cause a corresponding unbalance in the division of flux between the two outer legs 124 and 126 of the core 108 and can be measured by any suitable arrangement, for example, by means of windings 128 and 132 arranged like the corresponding windings 38 and 42 of Figure 2.

Figure 4:
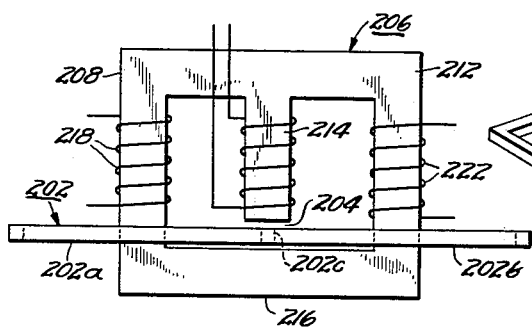
Figure 4 shows still another embodiment of the invention in which the movable element is in the form of a double ring.
Figure 5:
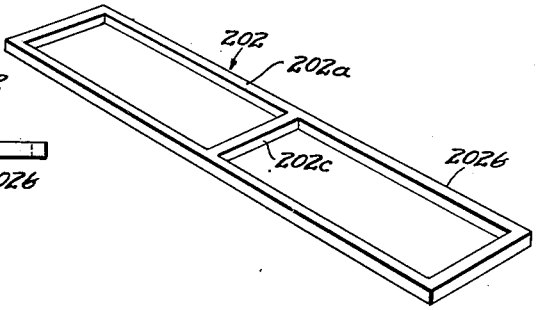
Figure 5 is a perspective view of the movable element of the movable ring shown in Figure 4.

Figure 4 shows an arrangement wherein the flux-barrier is in the form of a double ring, generally indicated at 202 (see also Figure 5), which is arranged to be moved transversely in an air gap 204 of a magnetic core structure, generally indicated at 206, which may be identical with core 24 of Figure 2. The flux-barrier 202 may be considered as formed of two separate ring portions 202a and 202b, which have a common side 202c, positioned within the air gap 204. The ring portion 202a surrounds a portion of the flux across the air gap 204 and, in addition, surrounds the outer leg 208 of the core 206. The ring portion 202b surrounds the remainder of the flux across the gap 204 and also surrounds the outer leg 212 of the core 206. Alternating flux is induced in the center leg 214 of core 206 and, with the flux-barrier 202 positioned symmetrically with respect to the magnetic structure, that is, so that the center conductor 202c of the flux-barrier bisects the air gap 204, an equal amount of flux will be induced in the two legs 208 and 212.

The flux-barrier 202 maintains this equalization of flux in the following manner: Flux lines which extend from the center leg 214 downwardly through the ring portion 202a also extend upwardly through this same ring portion 202a, so that these flux lines do not link with the ring portion 202a which, therefore, offers no opposition to this alternating flux. That is, the ring portion 202a offers no opposition to the flow of flux which at any instant extends twice through the ring portion 202a in opposite directions. However, the ring portion 202a will oppose any alternating flux with which it links. Thus, magnetic flux which extends from core leg 214 through ring portion 202b into core portion 216 is prevented from extending through core leg 208, and therefore extends through core leg 212. Thus, when the flux-barrier 202 is displaced toward the right, as viewed in Figure 4, the flux in core leg 208 is increased and the flux in core leg 212 is decreased by a corresponding amount.

The flux-barrier 202 can be coupled mechanically to any device whose movement or position is to be measured. The windings 218 and 222, which surround the core legs 208 and 212, respectively, in order to measure the flux, can be connected to any desired measuring or control system, the arrangement for inducing the flux and for measuring the unbalance thereof being substantially as shown in Figure 2.

The embodiment of the invention shown in Figure 4, as well as earlier described embodiments, is well adapted for measuring displacements wherein expansion or contraction of the mechanical parts of the system is likely to cause appreciable errors in the measurements. For example, because the position responsive device measures the relative positions of the center core leg 214 and the flux-barrier 202, the fixed member of the mechanical measuring system can be anchored directly to the core leg 214, while the movable member is connected to the flux-barrier 202. For example, in a gauge for measuring thickness (not illustrated), the base of the gauge can be anchored to the center core leg 214 (or even to the outer core portions, such as 208 or 212) by suitable non-magnetic material, and the movable feeler gauge can be coupled by similar material to the flux-barrier, so that the connecting members, being of substantially the same length and material, will expand and contract by the same amounts and thereby eliminate to a large extent errors produced by temperature changes.

In each of the embodiments of the invention thus far described, considerable over-travel of the flux-barrier is possible without injury to the measuring device. Thus, in the embodiment of Figure 4, the movement of flux-barrier 202 is limited only when the common side 202c strikes one or the other of the magnetic core legs 208 and 212.

In the embodiment shown in Figure 6, infinite over-travel of the movable element is permitted. A core, generally indicated at 302, of magnetic material such as a good grade of soft iron, is arranged generally like the core 12 of Figure 1, but its inner core leg 304 extends farther downwardly to form two air gaps 306 and 308, on opposite sides of core leg 304 between the outer surfaces of core leg 304 and the opposing surfaces of inwardly extending toes 312 and 314, respectively, of the outer core legs 316 and 318. As in the earlier-described embodiments, alternating flux is induced in the inner core leg 304 by means of an energizing winding 322 connected to a suitable source of alternating current (not shown). In order to control the distribution of flux between the outer legs 316 and 318, a flux-barrier assembly, generally indicated at 324 (see also Figure 7), comprising a generally U-shaped bracket 325 of insulating material, is arranged to position, simultaneously, two flux-barriers 326 and 328 in the air gaps 306 and 308, respectively.

The flux-barrier 326 is formed of a sheet of non-magnetic conductive material, for example, copper, and its free end is shaped as shown in Figures 7 and 8. The flux-barrier 328 is identical with the flux-barrier 326 except that it is tapered in the opposite direction as shown in Figures 7 and 9. The fact that the flux-barriers 326 and 328 are in the form of plates or sheets rather than in the form of a ring does not interfere with their functioning to prevent change in the flux lines through them, because circulating currents are induced in these plate-like flux-barriers as if they were shorted turns.

With the flux-barriers 326 and 328 centered, respectively, in the air gaps 306 and 308, there is equal distribution of the flux in the outer core legs 316 and 318. However, if the flux-barrier assembly 324 is moved in a direction perpendicular to the plane of the paper of Figure 6, for example, outwardly toward the reader, the area of flux-barrier 328 within the air gap 308 decreases, whereas the area of flux-barrier 326 within its air gap 306 increases, thus unbalancing the flux distribution and inducing a relatively larger amount of flux in core leg 318 than in core leg 316. If the flux-barrier assembly 324 is moved in the opposite direction, into the paper as seen in Figure 6, the core leg 316 will carry the larger amount of flux.

It is to be noted that the flux-barrier assembly 324 does not physically surround any part of the magnetic core 302, thereby permitting the desired infinite over-travel. Moreover, several identical magnetic structures can be arranged to cooperate alternately with a single flux-barrier assembly, or several flux-barrier assemblies can be arranged for alternate cooperation with a single magnetic core assembly. For example, in the positioning of elevators in a building, a flux-barrier assembly such as that shown in Figure 6 may be positioned on each floor of the building and a magnetic core assembly mounted on the elevator, so that as the elevator passes each floor, one of the flux-barrier assemblies extends into the air gaps 306 and 308. Appropriate circuits, well known in the art, can then be provided so that the elevator can come to rest only when the amplitudes of the magnetic flux in the transformer legs 316 and 318 are balanced.

It is apparent that the bracket 325 can be constructed of either conductive or non-conductive material and that it may assume any desired configuraion. The bracket 325 and the flux-barriers 326 and 328 can be formed, for example, integrally from a single strip of copper, brass, or other conductive non-magnetic material.

By connecting the three windings in series, the device can be made to function as a variable inductance in which the magnitude of the inductance is a function of the displacement of the flux-barrier assembly 324. Thus, the device can be connected into a conventional A.-C. bridge circuit and balanced against a variable capacitance, resistance, or inductance. This arrangement will sometimes make it more convenient to incorporate the device into certain types of commercial measuring instruments.

Figure 10 shows a follow-up system employing two position responsive devices. The position responsive device 12 is identical with the one shown in Figure 2, but may assume, of course, the form of other embodiments described herein. The position responsive device 100 is identical with that described in connection with Figure 3, wherein the flux-barrier 102 is arranged to pivot about its lower edge, at 104. The flux-barrier 18 of device 12 is arranged to be moved in response to changes in the value of a condition which is to be measured, and flux-barrier 102 of device 100 is utilized for rebalancing the system, as will be explained later.

Alternating current supply lines 400 and 402 are connected to opposite ends of the energizing winding 36 of the position responsive device 12, and also to the energizing winding 123 of position responsive device 100. The output signal from the position responsive device 12 is connected in series opposition with the signal from the position responsive device 100, so that the difference signal from these two devices appears on leads 404 and 406 which are connected, respectively, to terminals 408 and 412 of an amplifier-detector unit shown in block form at 414. This circuit may be traced from terminal 408 through lead 404 and winding 38 of core 24, lead 416, winding 42 of the same core, lead 418, winding 128 of core 108, lead 422, winding 132 of the latter core, and thence by lead 406 to terminal 412.

With this arrangement, if both of the position responsive devices 12 and 100 are in balance, or out of balance in the same direction and by the equal amounts, no unbalance voltage will appear between terminals 408 and 412. However, if any other condition exists, an unbalance voltage will be produced at terminals 408 and 412, the magnitude of which depends upon the extent by which the position of the rebalancing flux-barrier 102 fails to correspond with the position of flux-barrier 18, and the phase of which depends upon the direction of unbalance.

The voltage developed across terminals 408 and 412 is applied to a high impedance input circuit of the electronic amplifier and detector system indicated in block form at 414. The phase detecting portion of this device compares the phase of the unbalance voltage from terminals 408 and 412 with the phase of the voltage from the supply lines 400 and 402, which are coupled also to the amplifier-detector 414. The output voltage from the amplifier-detector 414 is applied to a suitable driving mechanism, generally indicated at 424, comprising a two-phase reversible motor, a reversible solenoid type motor, or other suitable mechanism, which is mechanically linked to cause rotation of the flux-barrier 102 about its pivot 104. The direction of rotation of the driving mechanism 424 ordinarily will be controlled in accordance with the phase of the voltage delivered by the amplifier-detector 414 and will move the flux-barrier 102 in such direction as to equalize the unbalance potentials of the two position responsive devices 12 and 100. When these unbalance voltages are equal, no further voltage is supplied to the driving mechanism 424 by the amplifier-detector 414 and the system is then in balance. This balance condition will be maintained automatically by the angular movement of the flux-barrier 102 in correspondence with the movement of the flux-barrier 18 of position responsive device 12 as the flux-barrier 18 follows variations in the value of the unknown condition. An indicating unit or recorder, generally indicated at 426, can be coupled mechanically, or otherwise, to the driving mechanism 424 and calibrated in terms of the unknown condition; or various control devices, well known to those skilled in the art, can be controlled thereby.

The use of two similar position responsive devices provides a relatively simple and highly accurate follow-up system. Moreover, the system has the advantage that the balance position, and thus the accuracy of the system, is substantially independent of line voltage variations. It is to be understood that other position responsive devices described herein can be substituted for either one or both of the position responsive devices shown in Figure 10, however the pivoted flux-barrier is advantageous where only rotary rebalancing motion of very low torque is available for rebalancing.

Figure 11 shows another embodiment of the invention utilizing a somewhat different core structure. This position responsive device, generally indicated at 500, comprises a core, generally indicated at 502, of soft iron formed by an outer rectangular framework 504 and a center core leg 506, generally similar to the core 24 of Figures 1 and 2. However, in this embodiment the center core leg 506 is bifurcated to form two identical, spaced, parallel, downwardly-extending legs 508 and 510, the lower surfaces of which define, in conjunction with the adjacent inner surface of framework 504, two air gaps 512 and 514.

Alternating flux is induced in the center core leg 506 by means of an energizing winding 516, which surrounds the upper portion of leg 506 and to which alternating current is supplied from a suitable source, as from source 44 of Figure 2.

A flux-barrier 518 is positioned for movement in the air gaps 512 and 514, in the directions indicated by the arrow 522, and may be in the form of a rectangular plate of copper, or other suitable conductive non-magnetic material. The flux-barrier 518 preferably is somewhat wider than the space between the core legs 508 and 510 so that when it is positioned centrally of the leg 506 it extends into both of the air gaps 512 and 514. When the flux-barrier 518 is positioned symmetrically with respect to the air gaps 512 and 514, the flux is divided equally between the core legs 508 and 510. However, if the flux-barrier 518 is moved toward the right, as viewed in Figure 11, the effective area of air gap 514 is decreased, thus reducing the flux density in the core leg 510, while the area of air gap 512 is increased by a like amount causing a corresponding increase in the flux density in the core leg 508.

The flux-barrier is arranged to be movable in the directions of the arrow 522 by means of any desired mechanism, whereby the movement is a measure of the value of the condition which is to be determined. The relative division of the flux between the legs 508 and 510 is accordingly a measure of the lateral position of the flux-barrier 518.

In order to measure this relative distribution of flux, two windings 524 and 526 are positioned, respectively, around core legs 508 and 510. These windings are connected in series opposition so that the difference between the two induced voltages appears between output leads 528 and 532 which may be connected to suitable measuring apparatus, such as that described in connection with Figure 2.

As stated above, the phase shift can be maintained at a low value by providing proper impedance relationships between the windings 508 and 510 and the input circuit to which the windings are connected. However, by changing impedance relationships, the phase shift introduced by movement of the flux-barrier 518 will be appreciable and the amount and direction of the phase shift will be a function of the magnitude and direction of the movement. Accordingly, with such an arrangement, the phase of the output signal can be measured by a suitable phase-comparison circuit to indicate the displacement of the flux-barrier.

It is possible to use the same windings for energizing the core and for picking up the unbalance voltages; Figure 12 shows such an arrangement. A core, generally indicated at 600, which is in all respects similar to the core 502 of Figure 11, includes a bifurcated center core leg 602 having two spaced parallel branches 604 and 606, the ends of which define one side of air gaps 608 and 612, respectively. A flux-barrier 614, comprising a plate of conductive non-magnetic material, is arranged to be positioned in the air gaps 608 and 612 by any desired arrangement by which the lateral position of the flux-barrier 614 is a function of the value of a condition to be measured, as was described more fully in connection with Figure 11. The flux-barrier 614 controls the division of flux between the branches 604 and 606 of core 602 just as in the embodiment of Figure 11.

Two windings 616 and 618, positioned, respectively, around core branches 604 and 606, are utilized both for energization of the magnetic core and for determination of the flux distribution. In this embodiment, these windings each form one arm of a bridge circuit. One end of each of the windings 616 and 618 is connected by a lead 622 to a terminal 624 of a source 626 of alternating voltage. The opposite end of winding 616 is connected through a resistance 628, which forms another arm of the bridge circuit, and a lead 632 to the other terminal 634 of the alternating current source 626. The corresponding end of winding 618 is connected through a resistance 636 to the same alternating current supply lead 632.

When the flux-barrier 614 is positioned in its zero position, so that the flux is distributed equally between the two core branches 604 and 606, the impedances of the windings 616 and 618 are substantially equal and the relative values of the resistors 628 and 636, one or both of which may be adjustable if desired, are selected so that no voltage appears between bridge output terminals 638 and 642. However, when the flux-barrier 614 is displaced from its zero position, say, toward the left as seen in Figure 12, the division of flux is unbalanced with less flux lines being produced in core branch 604 and a greater number of the flux lines being produced in core branch 606. This change in flux density causes a lower back E. M. F. to be developed in winding 616, thereby decreasing its effective impedance, while the increase in flux lines through winding 618 results in an increased back E. M. F. and a corresponding increase in its effective impedance. It is apparent that the bridge circuit will be unbalanced thereby and that an unbalance voltage, corresponding to the extent of the displacement of flux-barrier 614, will appear between terminals 638 and 642.

A measuring circuit, indicated diagrammatically as a meter 644, is connected between the output terminals 638 and 642 to indicate the unbalance in the flux division and thereby to denote the value of the unknown condition. It is to be understood that the meter 644 can be replaced by any desired measuring apparatus, for example, by the amplifier-detector arrangement shown in Figure 2.

With the core arrangement shown in Figures 11 and 12, it is not essential that the outer rectangular core portion by symmetrical with respect to the center core leg or that the two return paths therethrough, between the air gaps and the upper end of the center core leg 602, have equal reluctances. It is important that the two branches 604 and 606 of the center core leg 602 have as nearly identical magnetization characteristics as is possible. Sufficiently identical branches are easily obtainable because the center core leg can be formed of laminations in each of which the two core branches and the upper portion of the center leg are formed integrally from a single sheet of suitable transformer iron.

It is to be understood that reference to non-magnetic materials is meant to include materials which are ordinarily considered to be substantially non-magnetic, even though they may be magnetizable to some slight extent.

Although reference has been made herein to top and bottom members and upwardly and downwardly extending members, such terms have been used to simplify the description of the particular drawings and no inferential limitations are to be assumed therefrom as to the actual positioning of the devices embodying the invention.

From the foregoing it will be observed that the position responsive device embodying my invention is well adapted for the attainment of the ends and object hereinbefore set forth and to be economically manufactured, since the separate features are well suited to usual production methods.

Although various embodiments of the invention have been described, some of which are more advantageous for particular applications than others, it is apparent that the inherent characteristics produced in accordance with my invention render each of the embodiments useful for a large number of widely different applications. The high sensitivity and the stable response characteristic renders the device highly useful for precision measurements particularly where the total displacement is small. The absence of magnetic reaction in the flux-barrier together with its relatively low mass and its unrestrained freedom of movement enables precision measurements to be made where only very small displacement forces are available. The apparatus is well adapted for use with readily available measuring circuits and does not require the addition of auxiliary apparatus such as would be necessitated if a good null voltage, with minimum third harmonic content, were not produced, or such as would be required for compensation if appreciable phase shift were introduced by the position responsive device. The selective response to translation of the flux-barrier parallel to a given path permits wide variation in the manner of mechanical connection to the flux-barrier and obviates in many instances any need for a track to guide the movement of the flux-barrier and minimizes errors caused by undesired translation of the flux-barrier in directions other than the one being measured.

Subject matter not claimed in this application is claimed in divisional applications 299,897 and 299,898 filed July 19, 1952.

As many possible embodiments can be made of the above invention and as many changes might be made in the embodiments set forth, it is to be understood that all matter hereinbefore set forth or shown in the accompanying drawings is to be interpreted as illustrative and not in a limited sense.

I claim:

1. In apparatus for measuring physical displacement, the combination including a structure of ferromagnetic material having first and second circuit portions and including a circuit portion common to said first and second circuits, said magnetic structure being arranged to form first and second air gaps coupling said common circuit portion to said first and second circuit portions, respectively, first and second flux-barriers of non-magnetic material positioned, respectively, to extend into said first and second air gaps, said flux-barriers being arranged for simultaneous movement along said air gaps, an energizing winding coupled to said magnetic structure, a source of alternating current coupled to said energizing winding to induce magnetic flux in said structure, and first and second pick-up windings coupled, respectively, to said first and second circuit portions, whereby the division of flux between said first and second circuit portions is a function of the positions of said flux-barriers along said air gaps so that the relative voltages induced in said pick-up windings are a measure of said positions.

2. In apparatus for measuring physical displacement, the combination including a structure of magnetic material having first and second circuit portions and including a circuit portion common to said first and second circuits, said magnetic structure being arranged to form first and second air gaps between said common circuit portion and said first and second circuit portions, first and second flux-barriers comprising oppositely tapered sheets of non-magnetic metal, said flux-barriers being mechanically ganged and mounted for simultaneous movement along said air gaps, whereby movement of said flux-barriers in a first direction increases the coupling of flux between said common circuit portion and said first circuit portion and decreases the coupling of flux between said common circuit portion and said second circuit portion, an energizing winding coupled to said magnetic structure, a source of alternating current coupled to said energizing winding to induce magnetic flux in said structure, and first and second pick-up windings coupled, respectively, to said first and second circuit portions, whereby the division of flux between said first and second circuit portions is a function of the displacement of said flux-barriers along said air gap from a predetermined position so that the relative voltages induced in said pick-up windings are a measure of said displacement.

3. In a position-responsive device, the combination comprising a ferromagnetic circuit having first, second and third core portions, first permeable means including a first air gap arranged to couple magnetic flux between said first and second core portions, second permeable means including a second air gap arranged to couple magnetic flux between said second and third core portions, means for producing alternating magnetic flux in said second core portion, first and second electrically conductive elements arranged for linear movement through and relative to said first and second gaps, said elements being oriented so as to vary the flux coupled through said first air gap between said first and second core portions relative to that coupled through said second air gap between said second and third core portions, and means for measuring the relative amounts of flux in said first and third core portions.

4. In a position-responsive device, the combination comprising a ferromagnetic circuit having first, second and third core portions, first permeable means including a first air gap arranged to couple magnetic flux between said first and second core portions, second permeable means including a second air gap arranged to couple magnetic flux between said second and third core portions, means for producing alternating magnetic flux in said second core portion, first and second tapered electrically conductive elements arranged for movement along a linear path through said first and second gaps, the extent of said movement along said path being entirely unlimited by said position responsive device, said elements being oriented so as to vary the flux coupled through said first air gap between said first and second core portions relative to that coupled through said second air gap between said second and third core portions, and means for measuring the relative amounts of flux in said first and third core portions.

5. In a position-responsive device, the combination comprising a ferromagnetic circuit having first, second and third core portions, first permeable means including a first air gap arranged to couple magnetic flux between said first and second core portions, second permeable means including a second air gap arranged to couple magnetic flux between said second and third core portions, means for producing alternating magnetic flux in said second core portion, first and second electrically conductive elements arranged for linear movement through said first and second gaps, means ganging said elements in offset relationship so that as the area of one of said elements within its gap is increasing the effective area of the other is decreasing, said elements being oriented so as to vary the flux coupled through said first air gap between said first and second core portions relative to that coupled through said second air gap between said second and third core portions, and means for measuring the relative amounts of flux in said first and third core portions.

6. In a position-responsive device, the combination comprising a ferromagnetic circuit having first, second and third core portions, first permeable means including a first air gap arranged to couple magnetic flux between said first and second core portions, second permeable means including a second air gap arranged to couple magnetic flux between said second and third core portions, means for producing alternating magnetic flux in said second core portion, first and second tapered electrically conductive elements arranged for linear movement through said first and second gaps, means supporting said elements in fixed relative positions with the tapered portions thereof opposed, said elements being oriented so as to vary the flux coupled through said first air gap between said first and second core portions relative to that coupled through said second air gap between said second and third core portions, and means for measuring the relative amounts of flux in said first and third core portions.

7. In a position-responsive device, the combination comprising a ferromagnetic circuit having first, second and third core portions, first permeable means including a first air gap arranged to couple magnetic flux between said first and second core portions, second permeable means including a second air gap arranged to couple magnetic flux between said second and third core portions, means for producing alternating magnetic flux in said second core portion, a generally U-shaped flux control element having first and second parallel, tapered, conductive, non-magnetic plate-like arms, arranged for movement through said first and second gaps, said elements being oriented so as to vary the flux coupled through said first air gap between said first and second core portions relative to that coupled through said second air gap between said second and third core portions, and means for measuring the relative amounts of flux in said first and third core portions.

GRAYDON SMITH.

REFERENCES CITED

The following references are of record in the file of this patent:

UNITED STATES PATENTS

| Number | Name | Date |
|---|---|---|
| 2,207,248 | Garlick | July 9, 1940 |
| 2,379,417 | Conrad | July 3, 1945 |
| 2,416,159 | Dahline | Feb. 18, 1947 |
| 2,419,573 | Lawlor | Apr. 29, 1947 |
| 2,420,539 | Hornfeck | May 13, 1947 |
| 2,484,022 | Esval | Oct. 11, 1949 |